United States Patent [19]
Hulten

[11] 3,860,279
[45] Jan. 14, 1975

[54] RESILIENT ENERGY ABSORBING BUMPER ASSEMBLY

[75] Inventor: Richard E. Hulten, Durham, N.H.

[73] Assignee: McCord Corporation, Detroit, Mich.

[22] Filed: Jan. 15, 1973

[21] Appl. No.: 323,465

[52] U.S. Cl................ 293/72, 161/160, 293/63, 293/71 R, 293/88
[51] Int. Cl. ...... B32b 3/30, B32b 5/18, B60r 19/08
[58] Field of Search...... 293/60, 62, 63, 71 R, 71 P, 293/70, 72, 88; 161/160; 260/2.5

[56] References Cited
UNITED STATES PATENTS

| | | | |
|---|---|---|---|
| 1,724,431 | 8/1929 | Spear | 293/71 R |
| 2,188,082 | 1/1940 | Imhofe | 293/71 R |
| 2,829,915 | 4/1958 | Claveau | 293/63 X |
| 3,493,257 | 2/1970 | Fitzgerald et al. | 293/63 X |
| 3,540,768 | 11/1970 | Peters | 293/63 |
| 3,575,896 | 4/1971 | Kahn | 260/2.5 |
| 3,606,434 | 9/1971 | Barton et al. | 293/71 R |
| 3,639,748 | 2/1972 | Pearson et al. | 293/71 R X |
| R15,255 | 12/1921 | Limacher | 293/74 |

Primary Examiner—M. Henson Wood, Jr.
Assistant Examiner—Howard Beltran
Attorney, Agent, or Firm—McGlynn and Milton

[57] ABSTRACT

An energy absorbing assembly for rendering a vehicle more safe by absorbing and distributing energy upon impact of the vehicle bumper with a foreign object. The energy absorbing bumper assembly comprises an energy absorbing means which will absorb energy when the assembly is impacted at a first angle and which moves so as to not absorb energy when struck at a second angle different from the first angle, thus allowing the impact energy to be absorbed elsewhere on the bumper assembly.

9 Claims, 5 Drawing Figures

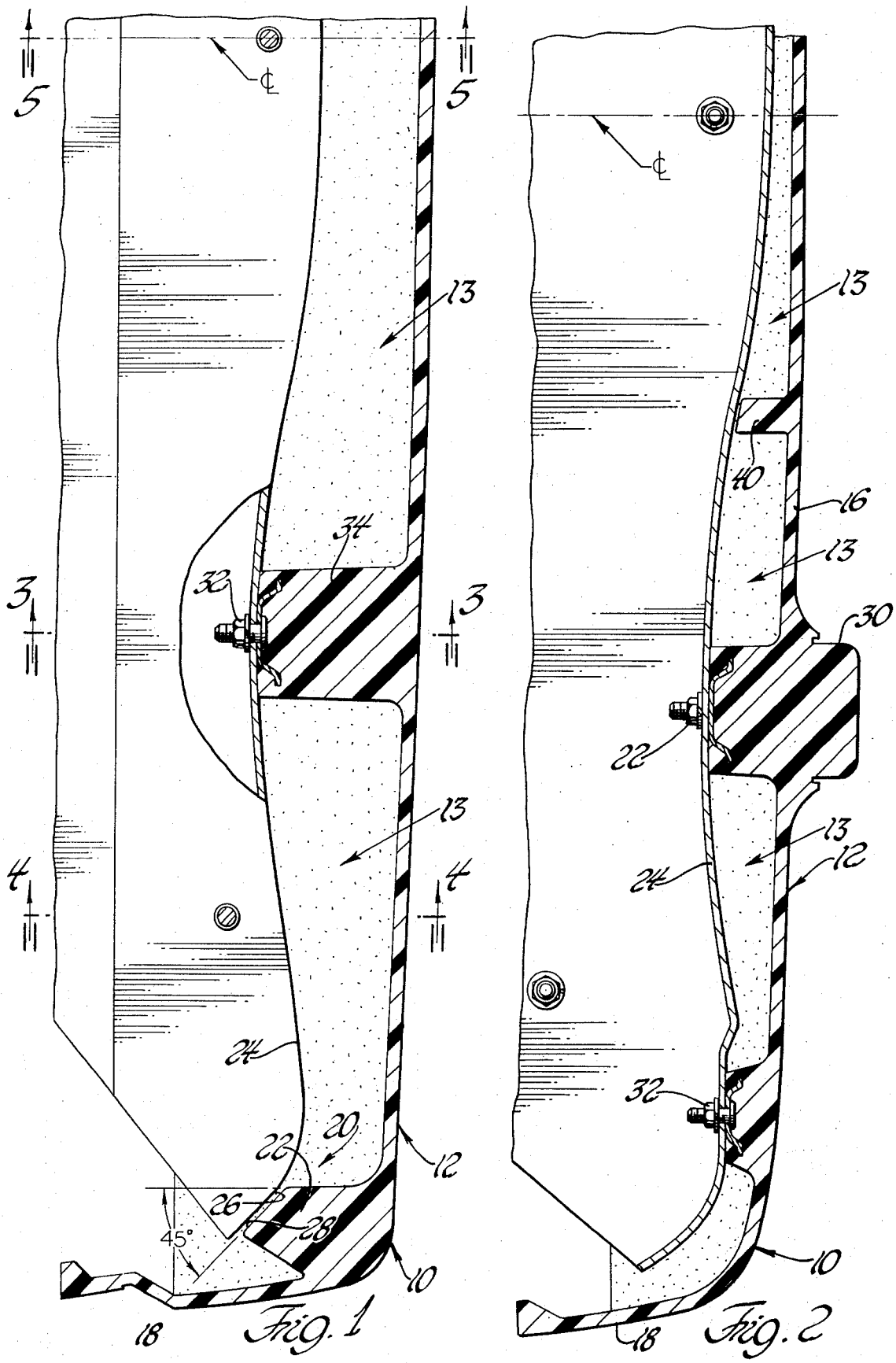

RESILIENT ENERGY ABSORBING BUMPER ASSEMBLY

This invention relates to an energy absorbing bumper assembly and more particularly to an energy absorbing bumper assembly for vehicles, the assembly rendering a vehicle more safe by absorbing and distributing energy upon impact of the vehicle bumper with a foreign object. The invention still more particularly relates to an energy absorbing bumper assembly containing an energy absorbing means which will absorb energy when the assembly is impacted at a first angle and which moves so as to not absorb energy when struck at a second angle different from the first angle, thus allowing the impact energy to be absorbed elsewhere on the bumper assembly.

Although particularly described with respect to energy absorbing bumper assemblies for automobiles, it will be appreciated that the invention has broader application such as serving as an energy absorbing bumper assembly for all types of vehicles and vessels as well as buildings, docks, machines and any other structure for which protection from impact is desired.

Because of concern regarding the protection afforded to automobile occupants and vehicle body structure by bumper assemblies, Congress has passed Federal Safety Standards setting forth requirements for the impact resistance and configuration of front and rear vehicle surfaces. These standards are set forth at Title 49, Chapter V, Part 571, section 571.215 of the U.S. Code and were effective Sept. 1, 1972. Specifically, the purpose of the standards is to prevent collisions from impairing the safe operation of vehicle systems. These standards require that the vehicle be able to sustain a number of specified impacts including impacts at a front corner and a rear corner at an angle of 30° to the front or rear surface thereof.

The problem confronted in designing a bumper assembly to meet this requirement is twofold. First, the assembly must be capable of sustaining a substantial impact on the corner thereof; and, second, the assembly must be designed such that when the assembly is impacted on the frontal surface thereof in the region of said corner it does not transmit the impact energy in a localized manner to the vehicle frame.

Accordingly, it is an object of this invention to provide an energy absorbing bumper assembly which will sustain an impact at the corner thereof and also sustain an impact frontally thereof in the area of said corner in such a manner as to allow the impact energy to be distributed evenly to the vehicle structure.

It is a further object of this invention to provide an energy absorbing bumper assembly including a bumper means for receiving an impact and energy absorbing means for absorbing energy when the bumper means is impacted at a first angle and for moving without absorbing energy when the bumper means is impacted at a second angle different from the first angle.

It is a still further object of the invention to provide an energy absorbing bumper assembly wherein the bumper means includes a frontal surface, a rearwardly extending surface disposed about a corner from said frontal surface, and an energy absorbing means disposed in said corner for absorbing energy when the corner of the bumper means is impacted at an angle of approximately 30° to the front or rear surface of the vehicle by a foreign object.

Other objects and attendant advantages of the instant invention will be readily appreciated as the same becomes better understood by reference to the following detailed description when considered in connection with the accompanying drawings wherein:

FIG. 1 is a sectional view of a bumper assembly embodying the invention taken along line 1—1 of FIG. 3;

FIG. 2 is a sectional view taken along line 2—2 of FIG. 3;

Figure 3:
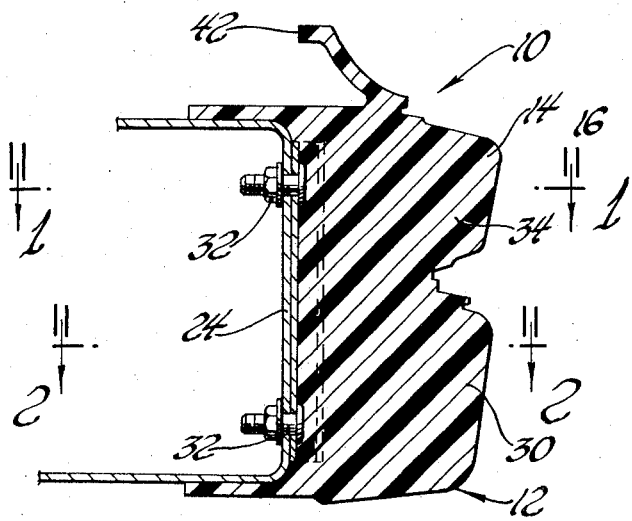
FIG. 3 is a sectional view of a bumper assembly taken along line 3—3 of FIG. 1.

Referring now to the drawings in more detail, an energy absorbing bumper assembly is generally shown at 10 in FIGS. 1 through 5. The energy absorbing assembly 10 includes a bumper means generally indicated at 12 for receiving an impact and absorbing energy from said impact. The bumper means 12 generally comprises a shell having cavities 13 therein of yieldable elastomeric material which is formed by molding or casting in the desired shape for the bumper. It will be appreciated that the shell may be molded or cast by known techniques in any design as long as the energy absorbing means, discussed hereinafter in more detail, are disposed so as to absorb impact energy from barrier and pendulum impacts and distribute the same to the frame of the vehicle.

Any of the well-known resilient elastomeric materials including natural and synthetic rubbers may be employed to form the shell 12. Preferably, however, the yieldable material is a foamed plastic material. A preferred foamed plastic material is microcellular polyurethane foam, which is well-known in the prior art, having a thick skin which provides strength and surface protection. In addition the cavities 13 may alternatively be filled with a microcellular foam. The microcellular foams produced by the preferred formulations for the shell 12 possess thick sturdy skins which give the automotive bumper part added strength and protect the interior foam structure from damage upon impact; furthermore, the skins have no pores and are, therefore, easily painted. The preferred formulation for the microcellular polyurethane is disclosed in U.S. Pat. No. 3,575,896, patented Apr. 20, 1971, and assigned to the assignee of this application. That formulation calls for a microcellular polyurethane foam produced by reacting a prepolymer system which is made by reacting toluene diisocyanate with an organic diol and a catalyst system comprising a mixture of organic diols, blowing agent, an organo metallic catalyst, an aromatic amine and a hydroxy compound.

The assembly 10 also includes an energy absorbing means generally indicated at 20 in FIG. 1 for absorbing energy when the bumper means is impacted at a first angle and for moving without absorbing energy when the bumper means is impacted at a second angle which is different than said first angle. As indicated in FIG. 1, which is a horizontal sectional view of a bumper taken at approximately 20 inches above the ground and hereinafter referred to as the upper portion of the bumper assembly, the bumper means or shell includes a frontal surface 16 and a rearwardly extending surface 18 disposed about a corner from said frontal surface. The energy absorbing means 20 is disposed at the corner of the bumper means and includes two surfaces 26 and 28.

Figure 4:
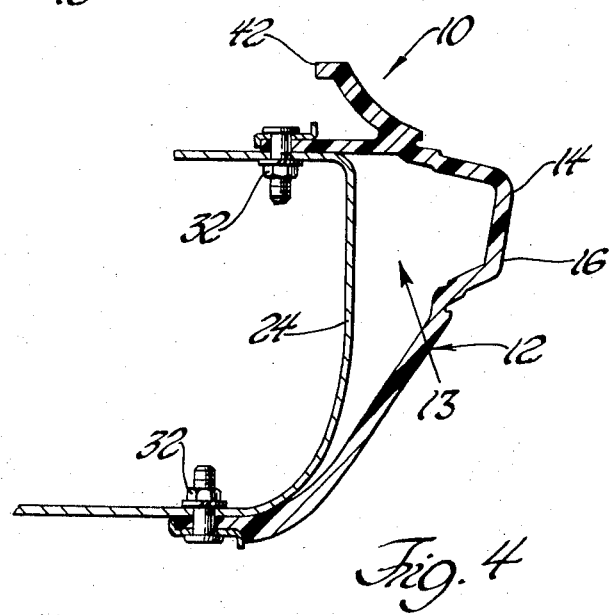
FIG. 4 is a sectional view taken along line 4—4 of FIG. 1.
Figure 5:
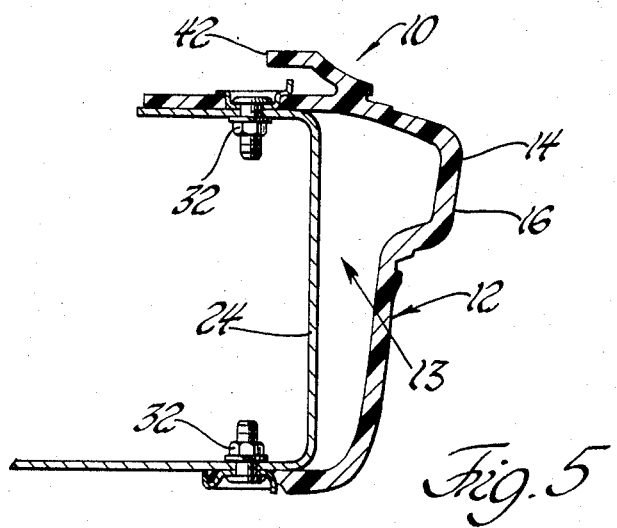
FIG. 5 is a sectional view taken along line 5—5 of FIG. 1.

The surface 28 is preferably an integral part of the bumper means or shell 12 and preferably comprises the inner surface of a block or blob of resilient elastomeric material 22 such as microcellular polyurethane foam. This block or blob of resilient elastomeric material 22 must be such as will crush or give approximately 2½ inches or more when impacted directly against support member 24. The surface 26 is part of the support means 24 to which the bumper means or shell is assembled. The support means 24 as best seen in FIGS. 3 through 5 is a U-shaped steel member which is secured to the bumper shell by bolts 32 and to the frame of the vehicle by known suitable means, not shown. This member serves to transmit energy absorbed by various energy absorbing means of the bumper means or shell to the frame of the automobile where it is distributed.

It will be appreciated by referring to FIG. 1 that when the bumper assembly is impacted by the above-discussed pendulum device on the corner thereof such that the surfaces 28 and 26 come into substantially direct contact, the block of resilient elastomeric material will be crushed somewhat. In so crushing, the block 22 will serve to absorb the impact energy and by being crushed directly against support member 24, energy from the impact will be transmitted through member 24 to the vehicle being protected. When the bumper assembly is impacted in the area of the corner but on the frontal surface thereof or, for that matter, in any manner such that the surfaces 26 and 28 do not directly contact, the energy absorbing means will act such that the surface 28 will slide or move along surface 26 and not transmit energy. This will allow the impacting body to move off of the corner of the bumper means and impact on other energy absorbing means such as are indicated at 30 in FIGS. 2 and 3.

As indicated above, surfaces 26 and 28 are disposed at an angle to the frontal surface of the bumper means. In the most preferred embodiment of this invention, this angle is 45° as indicated in FIG. 1. By so disposing these surfaces it has been found that the bumper assembly best absorbs the corner pendulum impact required by the above-discussed Federal Safety Standards while at the same time allowing other energy absorbing means of the bumper assembly to absorb and transmit energy from impacts at other angles.

Even though the above description and the drawing indicate that the energy absorbing means 20 is disposed only in the upper portion of the bumper assembly, it will be appreciated that such an energy absorbing means could also be disposed in the lower portion. Of course, the exact shape and surface angle of the block for such a means should be selected so as to best absorb the impacts to which the assembly is exposed.

The members 30 represent bumper guards which extend outwardly from the frontal surface of the bumper means so as to sustain impacts on the flat surface of the bumper assembly. These bumper guards 30 are located in the lower portion of the bumper assembly such as shown in FIGS. 2 and 3 and are spaced equidistantly on either side of the center line of the bumper. However, the upper portion of this preferred bumper assembly which functions as a rub rail 14 is also solid yieldable material as indicated at 34 in FIGS. 1 and 3 in those portions disposed directly above the bumper guards 30. These bumper guards and the corresponding portion of the rub rail will also crush approximately 2½ inches or more in order to absorb impacts on the frontal surface of the bumper and transmit the energy through the support member 24 to the frame of the automobile.

The particular assembly shown in the drawings also includes two auxiliary bumper guards 40 disposed inwardly of the bumper means or shell 12 at a position closer to the center line of the bumper assembly such that if an impact must be taken at a position in between the two bumper guards 30 there will a resilient member present to assist in absorbing the energy. These auxiliary guards 40, like the bumper guards 30, are located in the lower portion of the bumper assembly.

It is these bumper guards 30 and the portion 34 of the rub rail as well as the auxiliary guards 40 which absorb energy when a foreign body impacts the assembly at an angle other than that which causes surfaces 26 and 28 to squarely contact. Thus, as the body slides off the corner the major portion of the impact is absorbed by bumper guards 30 and 40 as well as the portion 34 of the rub rail. Of course, it should be appreciated that the various bumper guards and auxiliary guards may be positioned in whatever manner is suitable depending upon the particular structure being protected and the nature of the foreign body which might impact therewith.

As indicated in FIGS. 3 through 5 the bumper assembly of this invention may also include a lip portion 42 which serves to overlap and cover any opening between the body portion of the automobile and the bumper assembly.

The invention has been described in an illustrative manner and it is to be understood that the terminology which has been used is intended to be in the nature of words of description rather than limitation.

Obviously, many modifications and variations of the present invention are possible in light of the above teachings. It is, therefore, to be understood that the invention may be practiced otherwise than as specifically described above within the scope of the appended claims.

The embodiments of the invention in which an exclusive property or privilege is claimed are defined as follows:

1. An energy absorbing bumper assembly comprising: bumper means for receiving an impact and including an elongated shell member and an elongated support member; energy absorbing means between said shell member and said support member; said energy absorbing means including a block of energy absorbing material between said shell member and said support member, said support member having a first surface thereon and said block having a coacting second surface immediately adjacent thereto, said first and second surfaces being disposed generally at an acute angle relative to the direction of elongation of said members, said second surface being forced against said first surface when said shell member receives an impact generally perpendicular to said surfaces to maximize the energy absorption by said block, said second surface being movable relative to said first surface in response to an impact which is other than perpendicular to said surfaces to reduce the energy absorbed by said block.

2. An assembly as set forth in claim 1, wherein said shell member includes a frontal surface and a rearwardly extending surface disposed about a corner from said frontal surface, said block being disposed at said corner, said second surface being movable relative to said first surface when said frontal surface is impacted frontally.

3. An assembly as set forth in claim 2, wherein said energy absorption means includes a surface disposed at an acute angle relative to said frontal surface.

4. An assembly as set forth in claim 3, wherein said bumper means includes a shell member having an upper portion and a lower portion.

5. An assembly as set forth in claim 4, wherein said surface is on said shell member in said upper portion thereof.

6. An assembly as set forth in claim 5, including additional energy absorbing means for absorbing energy when said bumper means is impacted on the frontal surface thereof.

7. An assembly as set forth in claim 6, wherein said additional energy absorbing means are disposed in said lower portion of said shell section.

8. An assembly as set forth in claim 7, wherein said shell section comprises foamed plastic material.

9. An assembly as set forth in claim 8, wherein said foamed plastic material is microcellular polyurethane foam.

* * * * *